D. BAILEY.
MAKING ENDLESS WOVEN FABRICS.

No. 176,503. Patented April 25, 1876.

WITNESSES:
E. Neveux
John Goethals

INVENTOR:
D. Bailey
BY
ATTORNEYS.

UNITED STATES PATENT OFFICE.

DAVID BAILEY, OF DRESDEN, OHIO.

IMPROVEMENT IN MAKING ENDLESS WOVEN FABRICS.

Specification forming part of Letters Patent No. 176,503, dated April 25, 1876; application filed February 5, 1876.

*To all whom it may concern:*

Be it known that I, DAVID BAILEY, of Dresden, Muskingum county, Ohio, have invented a new and useful Improvement in Making Endless Woven Fabrics, of which the following is a specification:

My invention is an improvement in the manufacture of endless cloths, such as are known as felts for paper-makers' use and others', by weaving them in layers and folds in such manner as to make them endless—that is to say, they are woven in different layers, with folds on opposite sides of the loom, formed by working the filling or weft in the different layers passing around the fabric in regular order through the layers one after the other, and thus producing the endless fabric.

Figure 1:
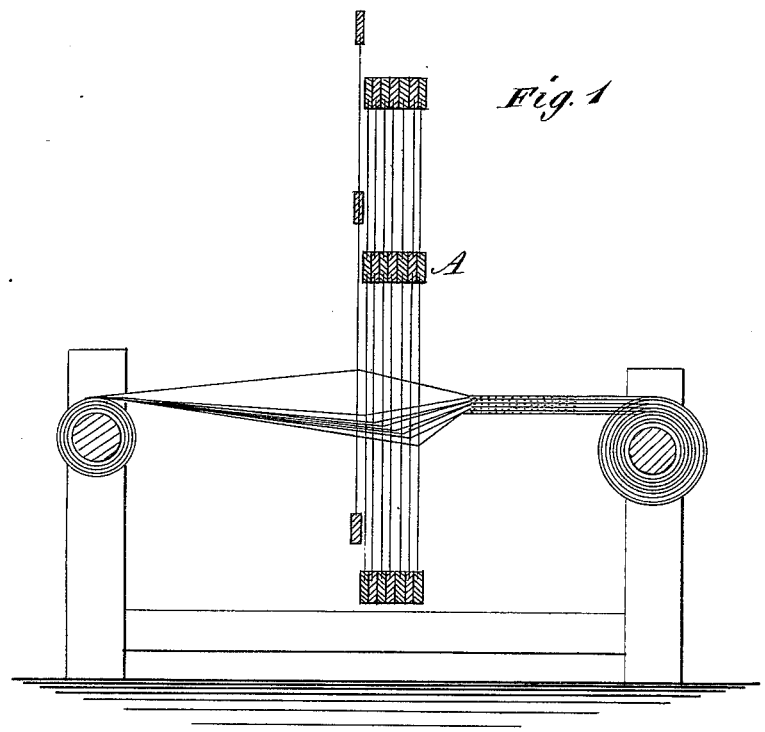
Figure 2:
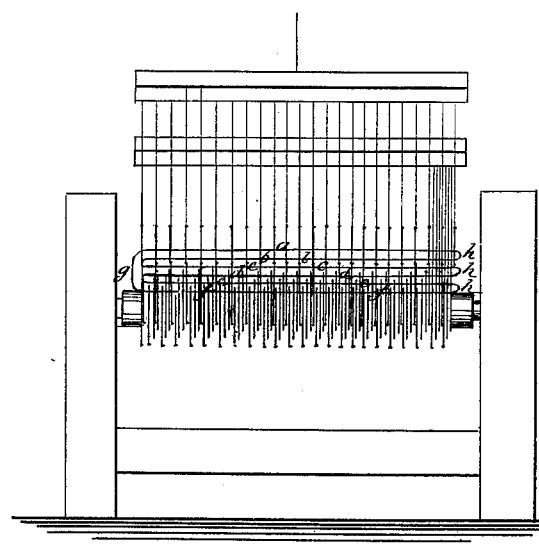

Figure 1 is a longitudinal sectional elevation of a loom; and Fig. 2 is a front elevation, showing the method of making endless woven fabrics according to my invention.

The loom is provided with as many different pairs of harness, A, for making as many different sheds as there are to be different layers, $a\ b\ c\ d$, &c., and they are operated as follows: After the shuttle has passed through and deposited its thread at the part $a$, the next shed is formed for the part $f$, which is so connected with part $a$ in the passing of the shuttle from one shed to the other as to form the fold $g$. Next, after going through the shed for part $f$, the shed for part $e$ is formed, and in passing from $f$ to $e$ the shuttle-thread makes the fold $h$, and so on, in the same order through all the layers and folds back to $a$, and around again, making endless fabrics of any length required, the length being limited only by the number of folds, which may be more or less, as required.

Having thus described my invention, I claim as new and desire to secure by Letters Patent—

The mode of weaving endless fabrics herein described, which consists in opening the sheds in the several pairs of warps in succession, so that independent layers $a\ b\ c\ d$, more or less, shall be formed and connected together by folds $h\ h\ g$, more or less, substantially as shown and described.

DAVID BAILEY.

Witnesses:
W. R. HENDERSON,
W. L. HENDERSON.